(12) United States Patent
Kawashima et al.

(10) Patent No.: US 12,138,557 B2
(45) Date of Patent: Nov. 12, 2024

(54) MOVABLE BODY

(71) Applicant: TOYOTA JIDOSHA KABUSHIKI KAISHA, Toyota (JP)

(72) Inventors: Mutsumi Kawashima, Nisshin (JP); Tomoaki Miyazawa, Nagoya (JP); Masato Noritake, Toyoake (JP); Nobuhiro Nishikawa, Tokyo (JP); Masato Kurima, Tokyo (JP); Tokuyuki Nishikawa, Toyota (JP); Reiko Tomita, Nagakute (JP); Takaaki Kato, Ichinomiya (JP); Hiroyuki Tomita, Aichi-ken (JP); Daisaku Kato, Iwakura (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 419 days.

(21) Appl. No.: 17/550,637

(22) Filed: Dec. 14, 2021

(65) Prior Publication Data
US 2022/0193562 A1 Jun. 23, 2022

(30) Foreign Application Priority Data

Dec. 17, 2020 (JP) ................................. 2020-208948

(51) Int. Cl.
*A63G 31/16* (2006.01)
*G06F 3/01* (2006.01)
(Continued)

(52) U.S. Cl.
CPC .............. *A63G 31/16* (2013.01); *G06F 3/011* (2013.01); *G06T 13/40* (2013.01); *G06T 13/60* (2013.01); *G06T 19/003* (2013.01); *G06T 19/006* (2013.01)

(58) Field of Classification Search
CPC ......... A63G 31/16; G06F 3/011; G06T 13/40; G06T 13/60; G06T 19/003; G06T 19/006
(Continued)

(56) References Cited

U.S. PATENT DOCUMENTS

| 5,004,225 A * | 4/1991 | Krukovsky ............ A63G 31/16 |
| | | 472/60 |
| 2011/0083075 A1 | 4/2011 | MacNeille et al. |

(Continued)

FOREIGN PATENT DOCUMENTS

| CN | 102030008 A | 4/2011 |
| CN | 205901943 U | 1/2017 |

(Continued)

*Primary Examiner* — Kien T Nguyen
(74) *Attorney, Agent, or Firm* — Dinsmore & Shohl LLP

(57) ABSTRACT

A movable body for transporting a visitor at a predetermined area includes a first display device configured to display a video on a virtual window being a display range defined on an inner surface of the movable body, and a display controller configured to partially altering a vehicle window view video which should be originally obtained from the virtual window when the virtual window is assumed to be a physical window, to generate an entertainment effect video. In an operation to generate the entertainment effect video, the display controller may partially or entirely convert a figure of a person contained in the vehicle window view video into that of a fictitious character or may convert at least one of persons contained in the vehicle window view video into an invisible form.

10 Claims, 12 Drawing Sheets

(51) Int. Cl.
  *G06T 13/40*     (2011.01)
  *G06T 13/60*     (2011.01)
  *G06T 19/00*     (2011.01)
(58) Field of Classification Search
  USPC .................................................... 472/59–61
  See application file for complete search history.

(56) References Cited

U.S. PATENT DOCUMENTS

| | | | |
|---|---|---|---|
| 2012/0256945 A1* | 10/2012 | Kidron | B66B 3/008 345/619 |
| 2013/0274024 A1* | 10/2013 | Geylik | A63G 31/16 472/60 |
| 2015/0339519 A1 | 11/2015 | Ueta et al. | |
| 2019/0124301 A1 | 4/2019 | Yoshii et al. | |
| 2019/0355178 A1 | 11/2019 | Hermina Martinez et al. | |

FOREIGN PATENT DOCUMENTS

| | | |
|---|---|---|
| CN | 111698543 A | 9/2020 |
| JP | 2000-342858 A | 12/2000 |
| JP | 2014-175704 A | 9/2014 |
| JP | 2015-222881 A | 12/2015 |
| JP | 2020-513956 A | 5/2020 |
| JP | 2020-141212 A | 9/2020 |
| WO | 2011/136209 A1 | 11/2011 |
| WO | 2017-208719 A1 | 12/2017 |
| WO | 2018/165039 A1 | 9/2018 |

* cited by examiner

MOVABLE BODY

CROSS REFERENCE TO RELATED APPLICATION

This application claims priority to Japanese Patent Application No. 2020-208948 filed on Dec. 17, 2020, which is incorporated herein by reference in its entirety including the specification, claims, drawings, and abstract.

TECHNICAL FIELD

This specification discloses a movable body for transporting a visitor within a predetermined area.

BACKGROUND

In a predetermined area having a special atmosphere of a fantasy world, such as, for example, an amusement park, theme park, or other type of attraction park, visitors may sometimes travel to desired destinations on a movable body, such as a vehicle. In several technical documents, it has been suggested that a specific entertainment effect be rendered so that visitors can be entertained even when they are travelling by the movable body.

For example, Patent Document 1 (JP 2000-342858 A) discloses a technique of arranging, along a travel route of a vehicle, artificial entertainment devices, such as, for example, background objects, water curtains, and dinosaur models to change the environment outside the vehicle as the vehicle moves. According to this technique, visitors can enjoy an entertainment effect that matches the atmosphere of a world within a park.

CITATION LIST

Patent Literature

Patent Document 1: JP 2000-342858 A
Patent Document 2: WO 2017/208719

However, to maintain the atmosphere of the park world, the technique of Patent Document 1 requires that all unplanned people or vehicles be excluded from the field of view from the vehicle. For this reason, with the technique of Patent Document 1 it is necessary that access of people and vehicles be restricted over a relatively wide area around the route travelled by the vehicle. In other words, an exclusive, broad space is required to provide the entertainment effect of Patent Document 1.

On the other hand, Patent Document 2 (WO 2017/208719) discloses a technique for displaying, on a display installed in a movable body, outside scenery along with a content video which is overlaid on the outside scenery. Application of the technique of Patent Document 2 to a movable body used within a park may be considered. That is, displaying on the display installed in the movable body a content video that matches the atmosphere of a park world may be considered in order to entertain visitors to the park. However, in the technique of Patent Document 2, the video of the content video to be displayed is a video unrelated to the outside scenery, such as, for example, a movie, and does not correlate with the actual environment outside the vehicle. In this regard, the content video proposed in Patent Document 2 lacks a feeling of reality, and is not able to offer visitors a satisfactory feeling of being immersed in the park world.

Under these circumstances, the present disclosure discloses a movable body capable of providing an enhanced feeling of being immersed in an atmosphere in a predetermined area of a specific world without the necessity of arranging an exclusive space for an entertainment effect.

SUMMARY

A movable body disclosed herein is configured to transport a visitor in a predetermined area, the movable body including a first display device configured to display a video on a virtual window being a display range defined on an inner surface of the movable body, and a display controller configured to partially alter a vehicle window view video corresponding to a view that would be seen through the virtual window were the virtual window a physical window, to generate an entertainment effect video, and display the generated entertainment effect video on the virtual window.

According to the above-described configuration, a highly entertaining vehicle window can be presented to a passenger without securing a broad exclusive space around the movable body. In addition, because the presented entertainment effect video is obtained by partially altering an actual view from the vehicle, the realism of the entertainment effect video is superior. As a result, it becomes possible to impart passengers with an impression of actually being in an imaginary world constructed with the particular theme of the predetermined area, which can enhance the passenger's feeling of being immersed in the world of the predetermined area.

In the above-described configuration, the display controller may be configured to convert a part or the whole of a figure of a person contained in the vehicle window view video into that of a fictitious character to generate the entertainment effect video.

The degree of realism of the entertainment effect video can be increased by converting the person who is actually present in the predetermined area into the fictitious character as described above.

In an aspect of the disclosure, the display controller may be configured to convert at least one of a plurality of persons contained in the vehicle window view video into an invisible form, to generate the entertainment effect video.

According to the above-described configuration, the passenger can enjoy a view of the predetermined area uninterrupted by the person present outside the vehicle.

In this aspect, the display controller may be further configured to determine the number of persons to be converted into the invisible form so as to maintain a count of persons or fictitious characters contained in the entertainment effect video at or below a predetermined number.

With the above-described configuration, the population density of persons and characters in the entertainment effect video can be reduced, which can allow the passenger to better enjoy viewing the scenery of the predetermined area.

In an aspect of this disclosure, the predetermined area may be divided into a plurality of zones having specific themes different from each other, and the display controller may be configured to change a subject of conversion in the vehicle window view video based on the theme of the zone where the movable body is located.

When configured as described above, the passenger can be supplied with varied entertainment effects, which can ensure that the passenger is more greatly entertained.

In this case, the display controller may be further configured to reduce content elements included in the entertainment effect video when the movable body is located close to a boundary between the zones to below the number of content elements included in the entertainment effect video when the movable body is in the middle of the zone.

The above-described configuration can allow the passenger to recognize a transition from one zone having a certain theme to another zone having another theme.

In an aspect of this disclosure, the movable body may further include an entertainment effect rendering device for producing at least one of vibration, a sound, an odor, moisture, and a wind that invokes a sense of feeling the presence of a fictitious character in a manner linked with the entertainment effect video.

With the above-described configuration, it becomes possible to produce an entertainment effect that cannot be produced by video and which enhances the degree of reality of the specific world of the predetermined area.

In an aspect of this disclosure, the display controller may be configured to generate and display, when a driving incident unpleasant to the passenger occurs, an entertainment effect video which creates an artificial impression that the unpleasant driving incident occurred due to the presence of a fictitious character.

According to the above aspect, the driving incident unpleasant for the passenger can be transformed into an event pleasing the passenger.

In an aspect of this disclosure, the movable body may further include a second display device configured to display a video on a virtual mirror being a display range defined on an inner region of the movable body, and the display controller may be configured to generate a virtual mirror image in which a figure of a person as would originally be reflected in the virtual mirror were the virtual mirror assumed to be an actual mirror is partially or entirely converted into that of a fictitious character, and display the generated virtual mirror image on the virtual mirror.

The above-described configuration can allow the passenger to have an impression that the passenger themself is a part of the world in the predetermined area, which can enhance the passenger's feeling of being immersed in the world of the predetermined area.

According to the movable body disclosed herein, the feeling of being immersed in the world of the predetermined area can be enhanced without securing an exclusive space for the entertainment effect.

DESCRIPTION OF EMBODIMENTS

Figure 1:
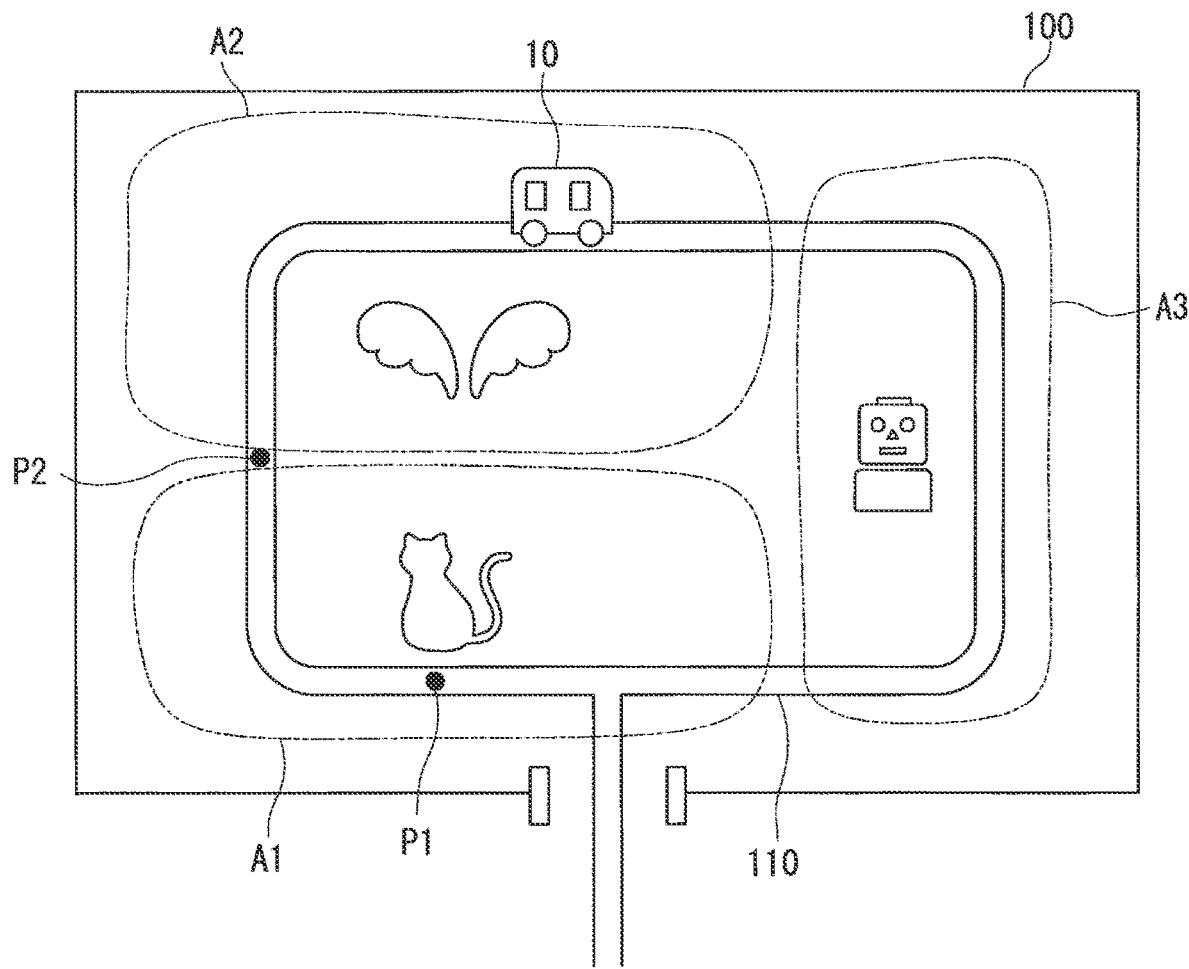
FIG. 1 is a schematic view showing the layout of a theme park where a movable body is utilized.

Hereinafter, a configuration of a movable body 10 will be described with reference to the drawings. FIG. 1 is a schematic diagram showing elements and their arrangement in a theme park 100 which is a predetermined area where the movable body 10 is utilized. The movable body 10 is provided to transport visitors at the theme park 100. The theme park 100 is divided into several zones, and a specific theme is established for each of the zones. In the description below, reference is made by way of illustration to the theme park 100 consisting of a first zone A1 having a theme of cats, a second zone A2 having a theme of angels, and a third zone A3 having a theme of robots.

In the theme park 100, a travel route 110 is defined as a loop passing through three zones A1 to A3. The movable body 10 moves along the travel route 110. It should be noted that a plurality of stopping places (not illustrated) are established along the travel route 110. The movable body 10 stops at each of the stopping places to pick up and drop off visitors. Therefore, in this example, the movable body 10 functions as a transit bus for transporting a large number of unspecified visitors between the stopping places.

However, the movable body 10 is not limited to the above-described operational configuration, and the operational configuration may be modified as considered appropriate. For example, the movable body 10 may not be limited to a specified travel route, but may independently select a travel route in accordance with instructions from a visitor. Alternatively, the movable body 10 may not necessarily be used by a large number of unspecified persons, but may be used only by a previously assigned individual or group (such as, for example, a family). In this example, the movable body 10 is a manually or automatically drivable automobile. However, the movable body 10 is not limited to an automobile, and may take the form of any vehicle, such as a boat or a ship, capable of transporting passengers. In a case where the movable body 10 is a boat, a water canal is built along the travel route 110.

Figure 2:
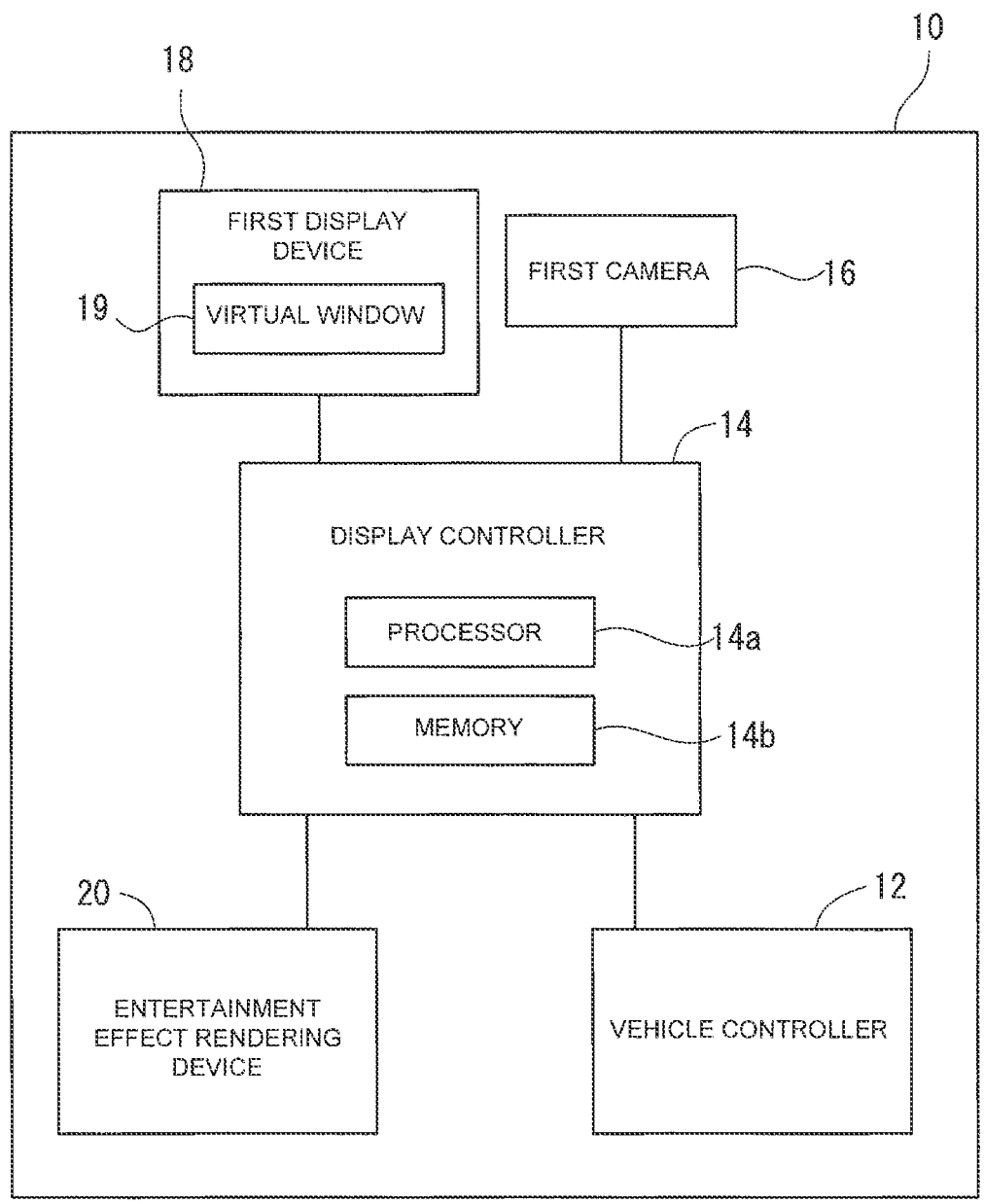
FIG. 2 is a block diagram showing a configuration of the movable body.

The movable body 10 has an internal space which is enclosed to a certain extent. The movable body 10 provides an entertainment effect which can provide a visitor inside the internal space with an enhanced feeling of being immersed in a world of the park. FIG. 2 is a block diagram showing a configuration of the movable body 10. It should be noted that FIG. 2 shows, among the components of the movable body 10, only those associated with operation to provide the entertainment effect. Hereinafter, the components shown in FIG. 2 are described.

A first display device 18 displays an entertainment effect video on an inner surface, such as, for example, a side surface or a front surface, of the vehicle. The entertainment effect video, which will be described in detail below, is obtained by rendering an entertainment effect to a video of a vehicle window view as would be obtained from a display range of the first display device 18 were the display range is assumed to be a physical window. In this regard, the display range of the first display device 18 functions as a virtual window 19 showing an external environment outside the movable body 10. The first display device 18 may be a single unit, or two or more first display devices 18 may be installed. The first display device 18 may include, for example, at least one of a liquid crystal display, an organic EL display, and a projector. In addition, the first display device 18 may further include a transparent display which functions as a transparent window when no video is displayed on the first display device 18.

A first camera 16 for photographing a view outside the movable body 10 is configured to acquire a vehicle window view video as would be obtained in the display range of the first display device 18 were the first display device 18 an actual window. A single vehicle window view video may be acquired from the single first camera 16, or may be acquired by combining a plurality of videos obtained from a plurality of first cameras 16 into a single vehicle window view video. Here, the number of first cameras 16 and placement thereof may be determined based on the position, orientation, and size of the display range of the first display device 18 (i.e., the virtual window 19).

A display controller 14 is configured to control display operation of the first display device 18. Specifically, the display controller 14 generates the entertainment effect video in which the vehicle window view video is partially altered, and operates the first display device 18 to display the generated entertainment effect video. The display controller 14 is physically implemented by a computer including a processor 14a and a memory 14b. The term "computer" as used herein includes a microcontroller in which a computer system is incorporated into a single integrated circuit. Meanwhile, the processor 14a denotes a processor in a broad sense and includes a general purpose processor (such as, for example, a Central Processing Unit, CPU) and a special purpose processor (such as, for example, a Graphics Processing Unit, GPU; an Application Specific Integrated Circuit, ASIC; a Field Programmable Gate Array, FPGA; and a programmable logical device). Further, the below-described operation of the processor 14a may not necessarily be performed by a single processor, but may be cooperatively performed by two or more processors which may be located at physically remote locations. Similarly as with the processor 14a, the memory 14b may not be a single physical component, but may be composed of two or more memories which are present at physically remote locations. In addition, the memory 14b may include at least one of a semiconductor memory (such as, for example, a RAM, a ROM, or a solid state drive) and a magnetic disc (such as, for example, a hard disc drive). Further, a single computer may function as the display controller 14 and also function as a vehicle controller 12 or an entertainment effect controller 44 which will be explained below.

The memory 14b in the display controller 14 stores various image processing programs. The processor 14a performs computation in accordance with the image processing programs to generate the entertainment effect video. The memory 14b in the display controller 14 also stores various data items used for generating the entertainment effect video. Generation of an entertainment effect video 24 performed by the display controller 14 will be explained in detail further below.

The movable body 10 further includes the vehicle controller 12 and an entertainment effect rendering device 20. The vehicle controller 12 controls traveling of the movable body 10. Similarly as with the display controller 14, the vehicle controller 12 is also a computer that includes a processor and a memory. The vehicle controller 12 controls a drive system of the movable body 10 based on an instruction input by an operator and detection results from various sensors. Here, an operator refers to a person who operates the movable body 10 to travel, and may be a driver onboard the movable body 10, or may be a person who remotely operates the movable body 10 from a management center located outside the movable body 10. The sensors include a sensor (such as, for example, a vehicle speed sensor) for detecting a condition of the drive system of the movable body 10 and a sensor (such as, for example, an infrared sensor, a Lidar, a position sensor, or an optical sensor) for sensing an external environment around the movable body 10. The vehicle controller 12 operates, in accordance with the instruction from the operator and based on detection values from the various sensors, the movable body 10 to enable autonomous travel.

Details of control processing performed by the vehicle controller 12 and the detection values from the sensors may be output to the display controller 14 as needed. For example, as will be described below, the display controller 14 changes entertainment effects to be rendered in the entertainment effect video based on the position of the movable body 10. The vehicle controller 12 continuously outputs the detection values from the position sensor (such as a GPS, for example) to the display controller 14 in order to enable a change in the entertainment effects. On the other hand, the display controller 14 changes the entertainment effects to be rendered in the entertainment effect video based on a driving condition of the movable body 10, such as, for example, an incident of application of harsh braking. For this reason, the vehicle controller 12 also continuously outputs to the display controller 14 at least a portion of the instructions which the vehicle controller 12 has output to the drive system.

The entertainment effect rendering device 20 generates at least one of vibration, sound, odor, moisture, or wind to impart a sense of feeling the presence of a fictitious character. The entertainment effect rendering device 20 includes generator devices for generating vibrations, for example, and a controller for controlling operation of the generator devices. A detailed configuration of the entertainment effect rendering device 20 will be explained below.

Figure 3:
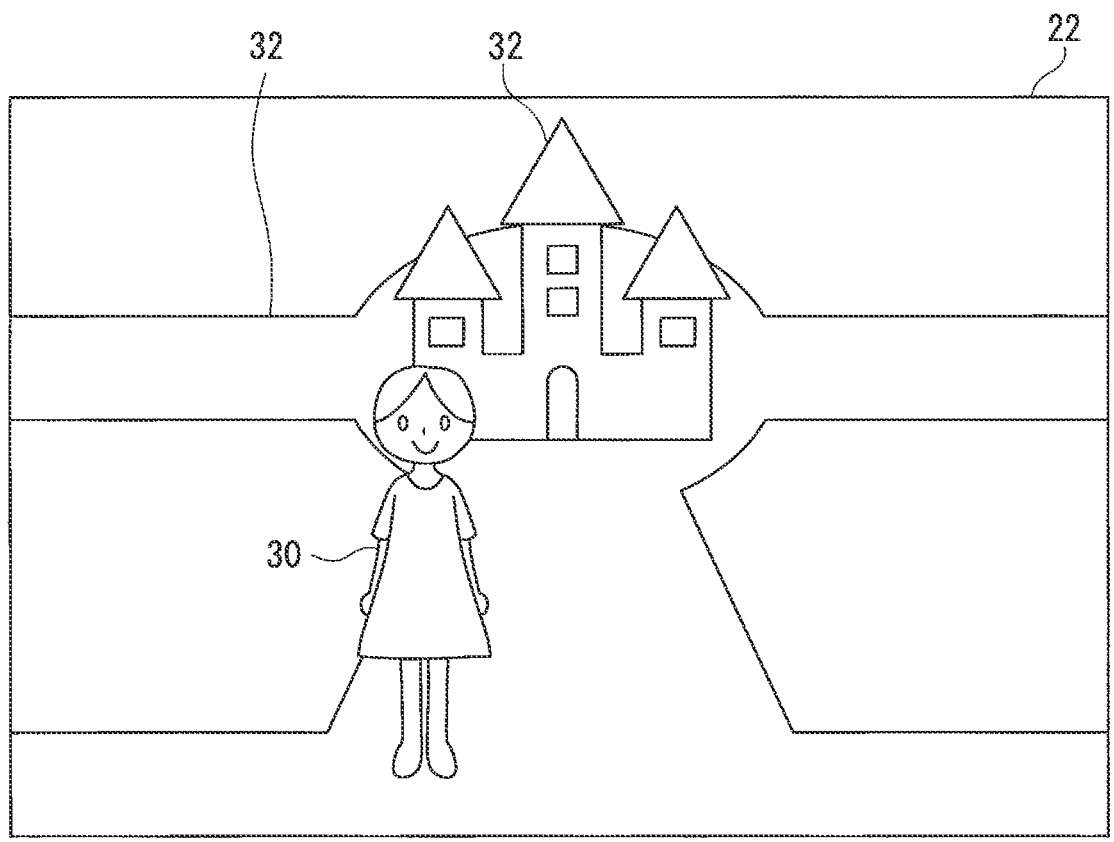
FIG. 3 shows an example of a vehicle window view video.
Figure 4:
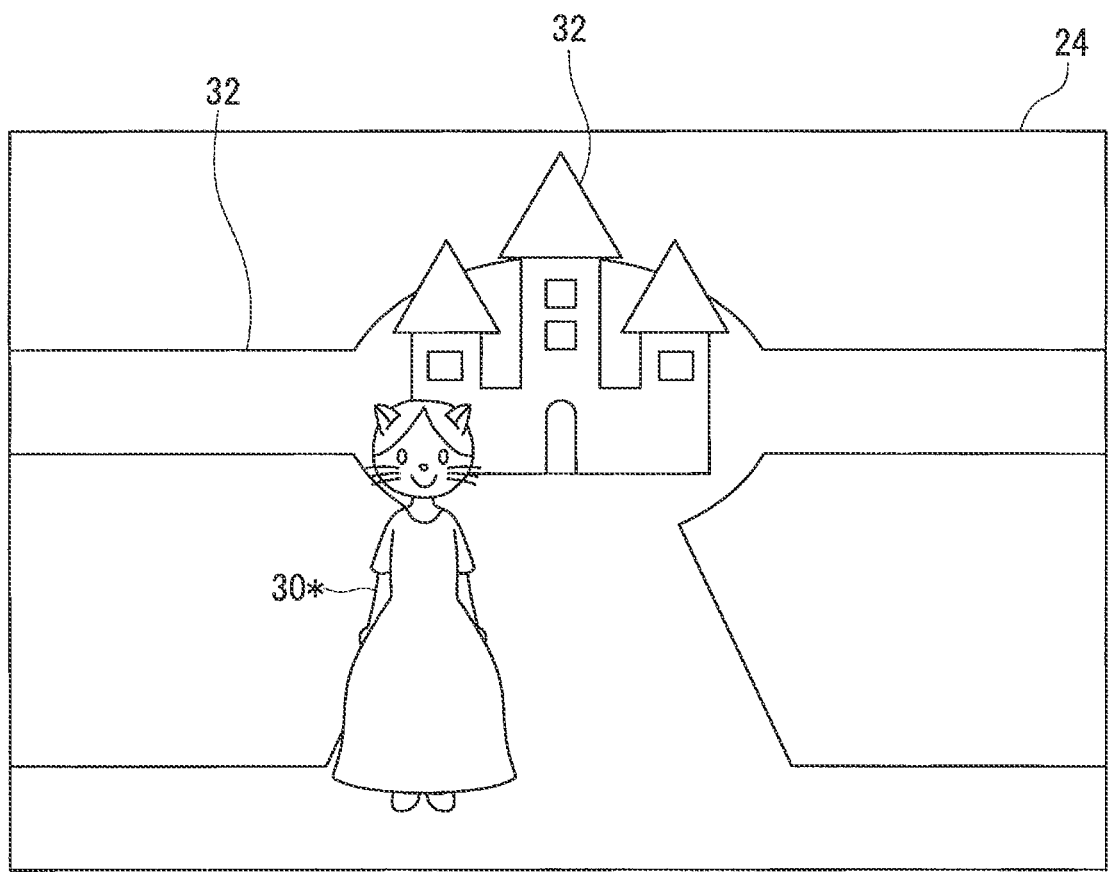
FIG. 4 shows an example of an entertainment effect video.

Next described is the entertainment effect provided in the movable body 10. FIG. 3 shows one example of a scene in the vehicle window view video 22, and FIG. 4 shows one example of a scene in the entertainment effect video 24. In this example, the entertainment effect video 24 obtained by partially altering the vehicle window view video 22 is displayed on the display range of the first display device 18 which functions as the virtual window 19, as described above.

The vehicle window view video 22 is a video of a vehicle window view as would be seen through the display range of the first display device 18 were the display range of the first display device 18 an actual window. The vehicle window view video 22 includes, as shown in FIG. 3, stationary objects 32, such as buildings, roads, and trees, together with a person 30, such as a visitor to the theme park 100. The entertainment effect video 24 is, as shown in FIG. 4, a video in which a figure of the person 30 contained in the vehicle window view video is partially or entirely converted into that of a predetermined character. In the example of FIG. 4, the entertainment effect video 24 includes a person 30\* whose figure is partially converted into that of a cat character.

When the video rendered with the entertainment effect that matches the theme of the theme park 100 is displayed on the virtual window 19 as described above, the passenger of the movable unit 10 can enjoy their travel time and also have an enhanced feeling of being immersed in the atmosphere of the world in the theme park 100. Meanwhile, the entertainment effect video 24 is obtained by partially altering the vehicle window view video 22. In other words, the entertainment effect video 24 includes some portion of the reality of the vehicle window view video 22. Accordingly, the degree of reality in the entertainment effect video 24 is enhanced, which can in turn help enhance the feeling of being immersed in the atmosphere of the world in the theme park 100.

Figure 5:
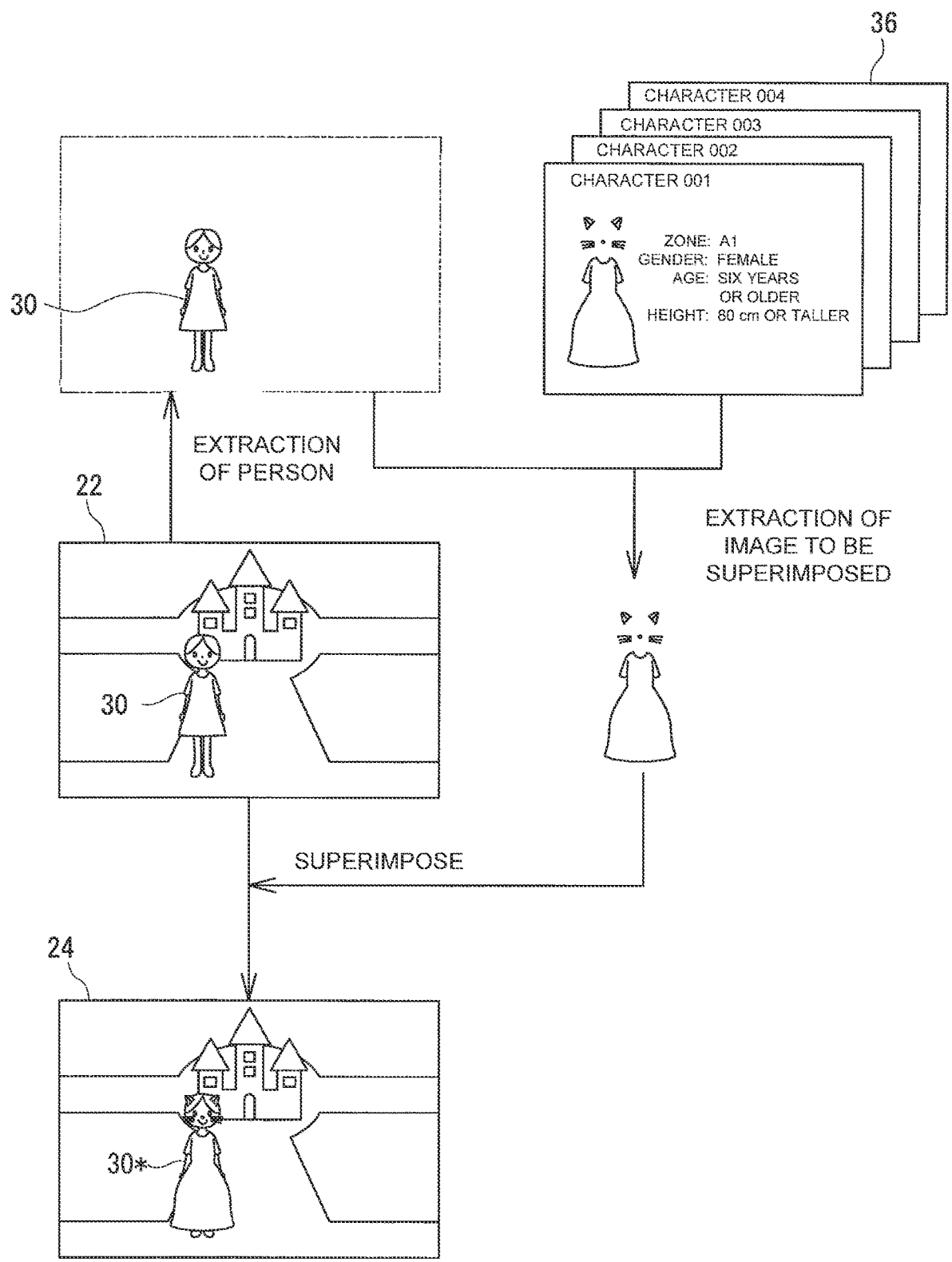
FIG. 5 is a schematic diagram showing a flow of generation of the entertainment effect video in FIG. 4.

FIG. 5 is a schematic diagram showing an example of a flow for generating the entertainment effect video 24. The display controller 14 previously stores entertainment effect data 36 for generating the entertainment effect video 24. The entertainment effect data 36 is data related to content elements which are added to or superimposed on the vehicle window view video 22. The entertainment effect data 36 includes, for example, three-dimensional shape information of features, such as, for example, ears and clothes, of characters matching the theme of the theme park 100. Here, data stored in the entertainment effect data 36 may be of one character or of a plurality of characters. When there are a plurality of characters, each of the characters is stored in connection with its properties, such as gender, physique, or age.

To generate the entertainment effect video 24, the display controller 14 initially acquires the vehicle window view video 22. The vehicle window view 22 may be a captured video itself obtained from the first camera 16, or may be generated by editing the captured video obtained from the first camera 16. For example, a discrepancy may arise in some cases between the captured video and the vehicle window view video 22 due to the position of the first camera 16 or the angle of view thereof. In this case, two or more captured images obtained from two or more first cameras 16 may be combined to generate the vehicle window view video 22.

Following the acquisition of the vehicle window view video 22, the display controller 14 extracts the person 30 from the acquired vehicle window view video 22. For extraction of the person 30, a known face detection or person detection technique, such as, for example, Histograms of Oriented Gradients may be utilized. In addition, the detected person 30 may be tracked by a Tracking-by-Detection technique, for example.

In any event, after the person 30 is extracted, the display controller 14 identifies a posture and characteristics of the extracted person 30. The characteristics of the person 30 may include at least one of gender, physique, and age. The posture and characteristics of the person 30 can be identified based on a positional relationship of feature points (such as, for example, eyes, nose, or jaw), an outline shape of the figure, and other features contained in an extracted image of the person 30. The display controller 14 selects, based on the identified characteristics of the person 30, a fictitious character that matches the person 30. When the person 30 is a woman, for example, the display controller 14 may select a female character. Then, the display controller 14 generates based on the posture of the person 30 an image of the character that is superimposed on the extracted image of the person 30. For example, when the person 30 is in a posture facing sideways, the display controller 14 identifies parts of the character that will be visible when the character is in a sidewise facing posture, and generates images of the visible parts based on the three-dimensional shape information of the character.

After the images of the character are generated, the display controller 14 superimposes the images of the character on corresponding parts of the person 30 in the vehicle window view video 22, to generate the entertainment effect video 24. The generated entertainment effect video 24 is displayed on the display range of the first display device 18; i.e., on the virtual window 19.

Figure 6:
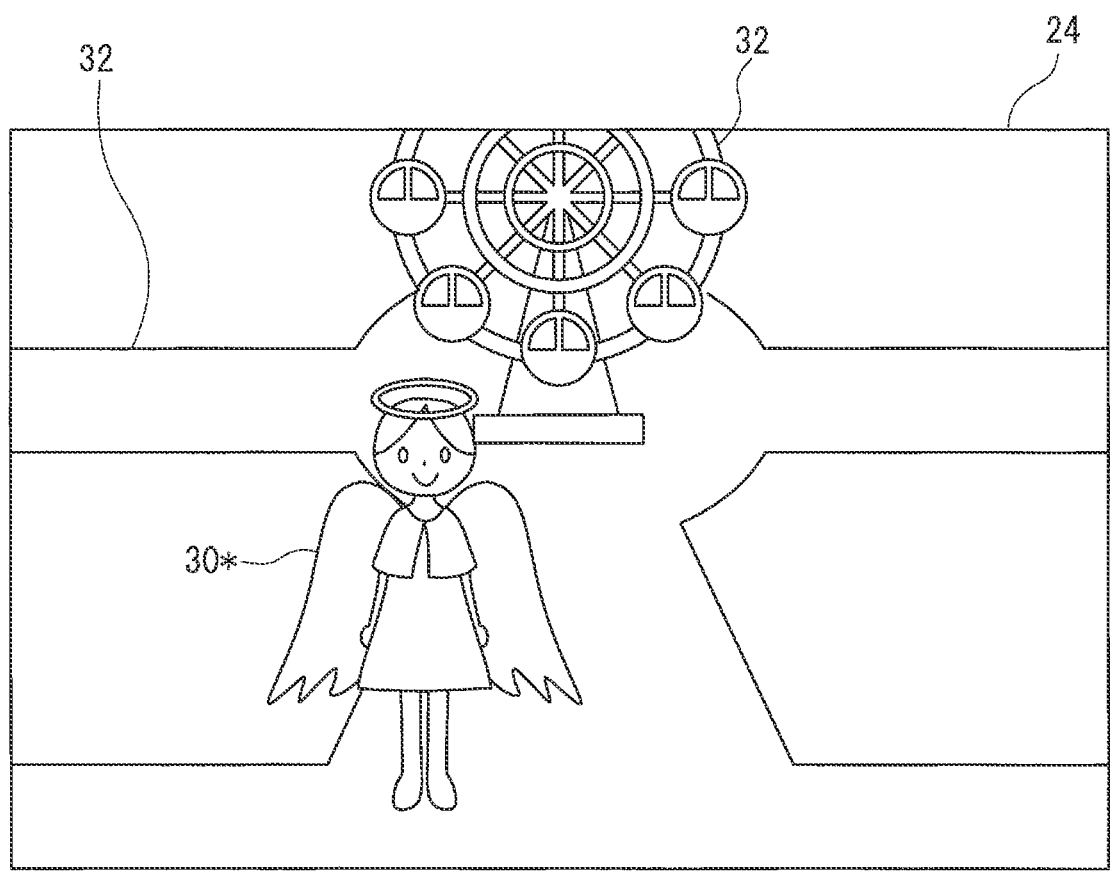
FIG. 6 shows another example entertainment effect video.

The character to be applied may be changed to another character based on the zone in which the movable body 10 is located. The memory 14b in the display controller 14 stores, as the entertainment effect data 36, information of a plurality of characters, and each of the characters is associated with a specific zone in the memory 14b. For example, characters related to cats are associated with the first zone A1 having the cat theme, and characters related to angels are associated with a second zone A2 having an angel theme. During the operation to select one of the characters to be applied to the person 30 in the vehicle window view video 22, the zone where the movable body 10 is presently located is identified. Then, the character applied to the person 30 is selected from among characters associated with the identified zone. Therefore, when the movable body 10 is located in the first zone A1 with the cat theme, for example, the person 30 is converted into the character related to the cat as shown in FIG. 4. On the other hand, when the movable body 10 is located in the second zone A2 with the angel theme, the person 30 is converted into a character related to the angel as shown in FIG. 6. When the entertainment effect is changed depending on the zones as described above, various entertainment effects can be offered to the passenger, which can lead to improved quality of entertainment. Meanwhile, because the entertainment effect to be applied is changed based on an actual location of the movable body 10, the passenger is able to clearly recognize their present location from the applied entertainment effect.

In the above description, only the image of the person 30 present in the vehicle window view video 22 is altered, but objects other than the person 30 may be altered in addition to or instead of the person 30. For example, images of eyes and a mouth may be superimposed on a plant present in the vehicle window view video 22, to render the plant as an intelligent character. Additionally or alternatively, a content element which is not present in the vehicle window view video 22 may be included therein. For example, an image of a giant cat, an image of an angel flying through the air, or an image of other objects may be superimposed on a scene in the vehicle window view video 22, to generate the entertainment effect video. Adding new content elements to the vehicle window view video 22 in this manner can further ensure that a highly entertaining entertainment effect video is generated.

Figure 7:
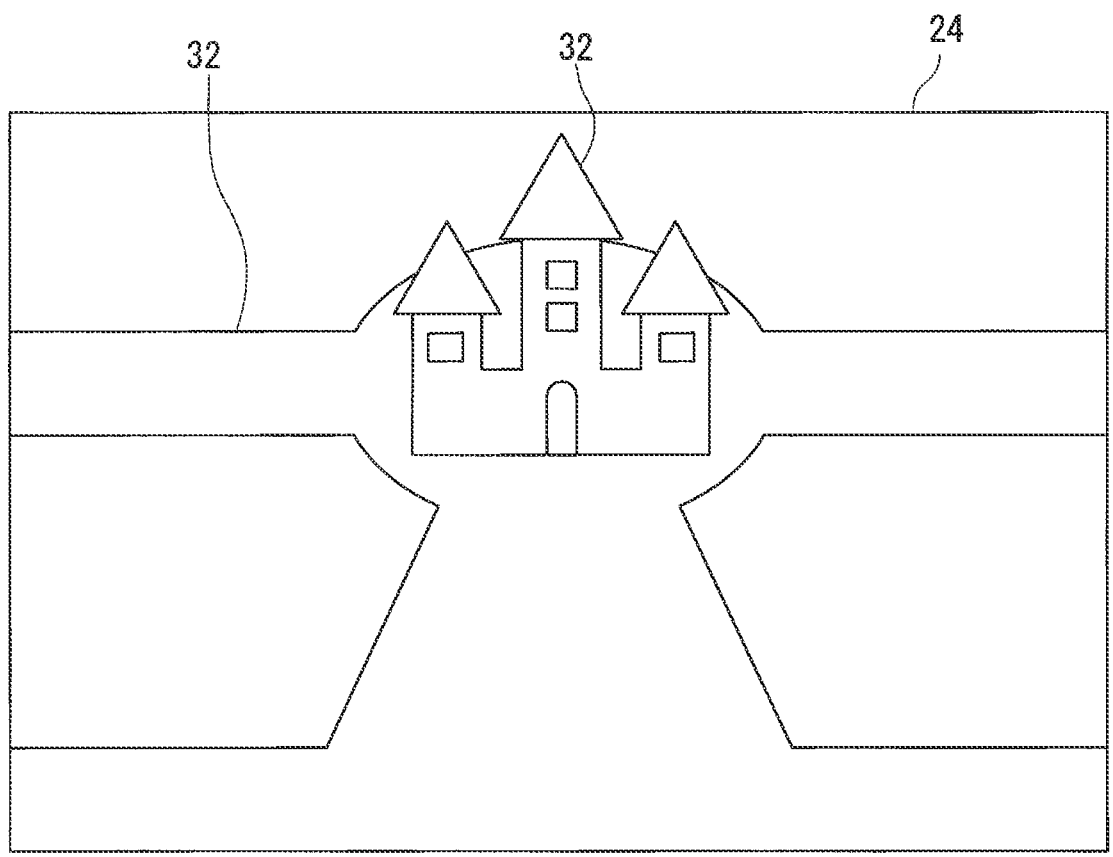
FIG. 7 shows a further example entertainment effect video.

Further alternatively, rather than being converted into a character, the person 30 may be rendered invisible. That is, when the vehicle window view video 22 is obtained with the person 30 being captured therein as illustrated in FIG. 3, an image processing to erase the person 30 as if the person 30 is not present may be applied to the vehicle window view video 22 which is then generated as the entertainment effect video 24. FIG. 7 shows an example of the entertainment effect video 24 that is generated from the vehicle window view video 22 shown in FIG. 3. When the person 30 is erased from the vehicle window view video 22 as described above, the visitor can enjoy a view of the scenery in the theme park 100 unhindered by the presence of other persons.

Figure 8:
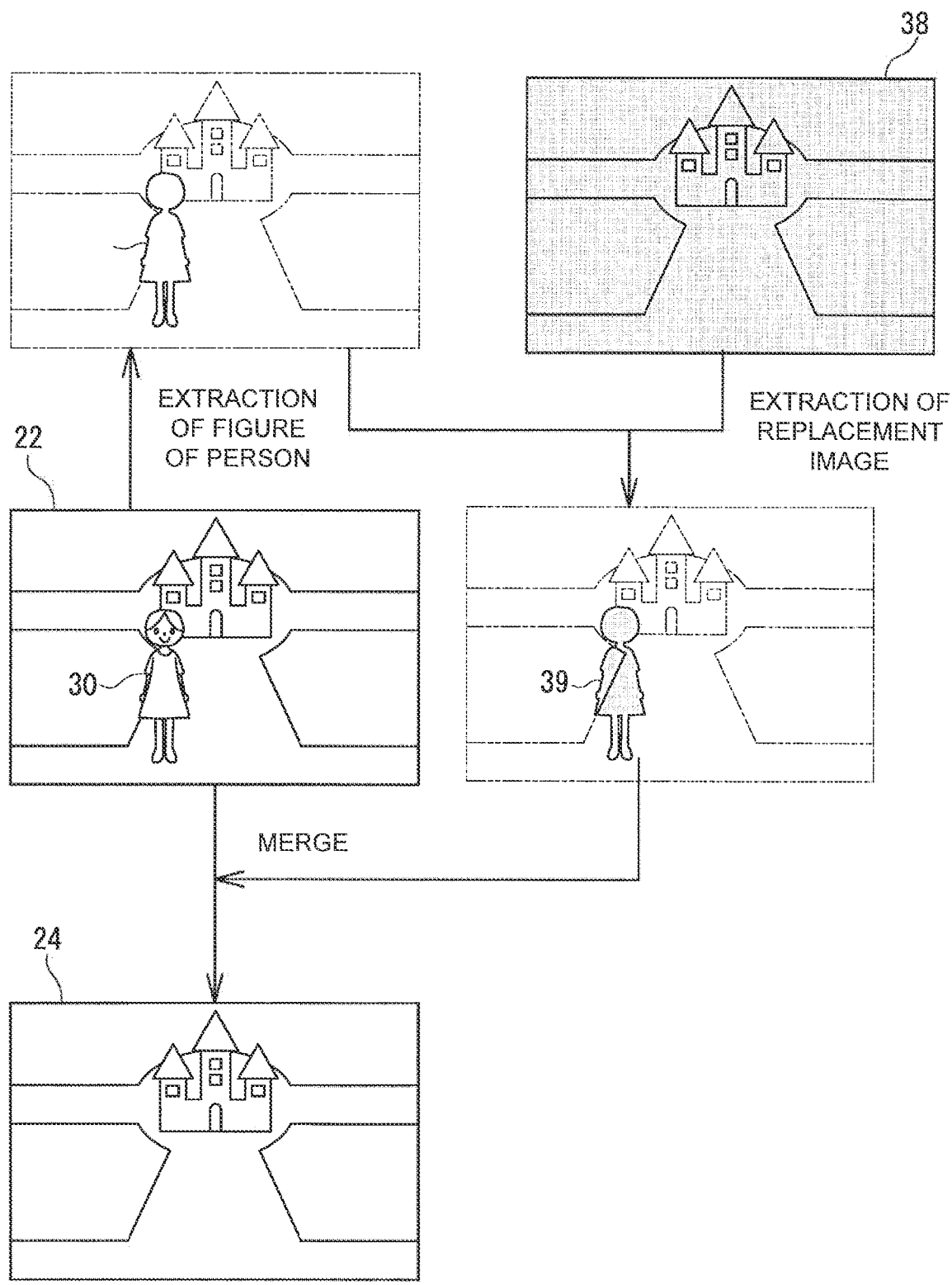
FIG. 8 is a schematic diagram showing a flow of generation of the entertainment effect video in FIG. 7.

FIG. 8 shows an example of a flow for generating the above-described entertainment effect video 24. The display controller 14 previously stores reference data 38 for generation of the entertainment effect video 24 shown in FIG. 7. The reference data 38 includes data about an image which is displayed in place of the image of the person 30. The reference data 38 may be three-dimensional image data of a multiplicity of stationary objects 32 existing in the theme park 100, or data of a vehicle window view video captured within the theme park 100 when the park is closed, i.e., the vehicle window view video in which no person appears.

To generate the entertainment effect video 24 in which the person 30 is rendered invisible, the display controller 14 acquires the vehicle window view video 22 and extracts the person 30 from the acquired vehicle window view video 22. Then, the display controller 14 generates, based on the reference data 38, an image which is displayed in place of the person 30. Specifically, the display controller 14 identifies a relative positional relationship among various stationary objects 32 and the movable body 10 based on the present location of the movable body 10. Next, the display controller 14 extracts, from the reference data 38, images of the stationary objects 32 located behind the person 30 (hereinafter such an image is referred to as a "replacement image 39") based on the identified relative positional relationship. Then, the display controller 14 merges the extracted replacement images 39 into the vehicle window view image 22 so as to replace the image of the person 30 with the extracted replacement images 39 in the vehicle window view video 22 which is then generated as the entertainment effect video 24. In operation to merge the replacement images 39, the display controller 14 corrects for tints and edges of the replacement images 39 with reference to the vehicle window view video 22. Specifically, tint and other features of the stationary object 32 may vary depending on actual weather conditions, time of day, and season. In particular, in a case where the stationary object 32 is a living thing, such as a plant, its shape and color will evolve over time. For this reason, the shape and colors of the stationary object 32 contained in the reference data 38 may differ in some cases from those of the stationary object 32 in the present state. With this in view, the display controller 14 estimates a present shape and color of the stationary object 32 based on the vehicle window view video 22, corrects for the shape and color of the replacement image 39 so as to closely approximate the estimated present shape and color of the stationary object 32, and merges the corrected replacement image 39 into the vehicle window view video 22.

A process to render the person 30 invisible may be applied to all the persons 30 captured in the vehicle window view video 22, or applied only to some of the persons 30. It should be noted that the process to render the person 30 invisible as explained with reference to FIGS. 7 and 8 may be performed on the same one vehicle window view video 22 simultaneously with the process to convert the person 30 into the character as explained with reference to FIGS. 4 and 5. For example, when ten persons 30 are captured in the vehicle window view video 22, five of the ten persons 30 may be rendered invisible and the remaining five may be converted into characters in the vehicle window view video 22 to generate the entertainment effect video 24. In this way, the number of characters displayed in the entertainment effect video 24 may be reduced to allow the visitor to more fully enjoy viewing both the characters and the scenery in the theme park 100.

The display controller 14 may employ a predetermined criterion for determining whether a person 30 is to be rendered invisible. For example, the display controller 14 may determine the number of persons 30 who are rendered invisible in such a manner that a count of persons 30 (including the persons 30 converted into characters) displayed in one frame of the entertainment effect video 24 is maintained at or below a predetermined reference number. For example, in a case wherein the reference number is set to ten and thirty persons 30 are present in one frame of the vehicle window view video 22, the display controller 14 renders twenty of the thirty persons 30 in that frame invisible. The persons 30 to be rendered invisible may be selected randomly, or selected so as to distribute the persons 30 more evenly. Alternatively, the display controller 14 may divide the frame into two or more blocks and select the persons 30 to be rendered invisible such that the number of faces of the persons 30 contained in each of the blocks does not exceed a predetermined block upper limit value. This is explained with reference to FIGS. 9 and 10.

Figure 9:
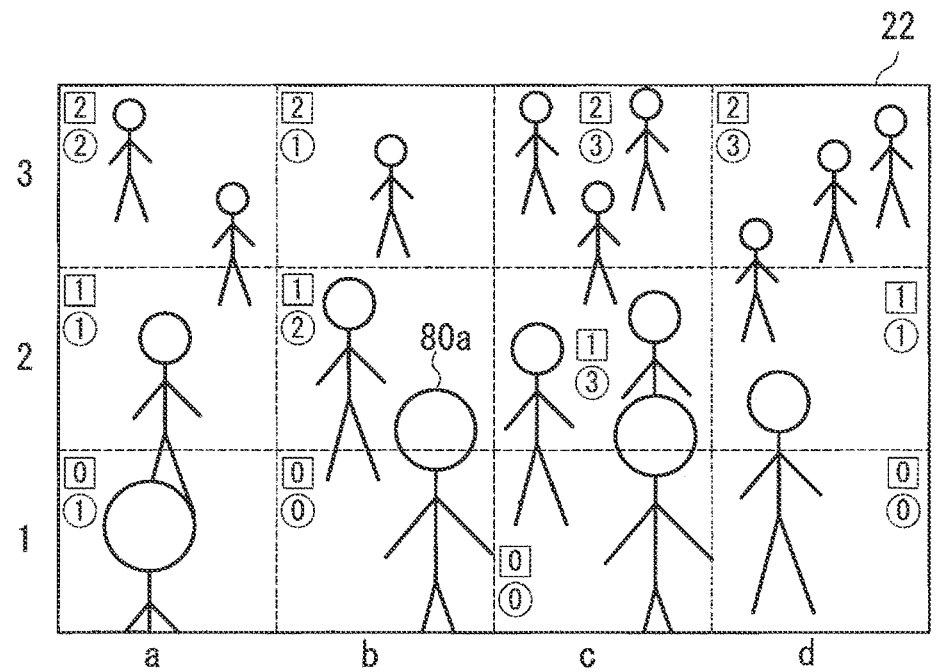
FIG. 9 shows an example of the vehicle window view video to illustrate an exemplary method for selecting persons to be rendered invisible.
Figure 10:
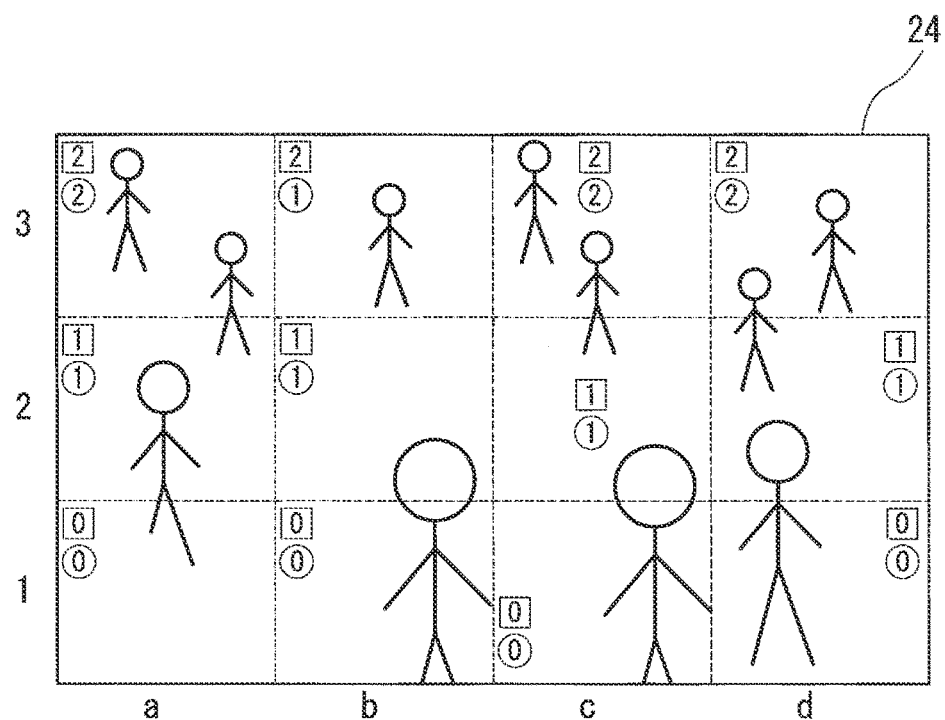
FIG. 10 shows an example of the entertainment effect video generated based on the vehicle window view video in FIG. 9.

FIGS. 9 and 10 show an example of a selection scheme for selecting the person 30 to be rendered invisible. FIG. 9 shows an example of the vehicle window view video 22, and FIG. 10 shows an example of the entertainment effect video 24 generated based on the vehicle window view video 22. Each of the frames constituting the vehicle window view video 22 is divided into blocks. In the example shown in FIGS. 9 and 10, each of the frames of the vehicle window view video 22 is divided into twelve blocks arranged in 4 columns and 3 rows. In the following description, each row of blocks is represented by a numeric latter, each column of blocks is represented by an alphabetic letter, and each block is represented by a combination of the alphabetic letter for the column and the numeric letter for the row. In FIG. 9, for example, the leftmost bottom block is referred to as a "block a1", and the rightmost top block is referred to as a "block d3". The same is applied to FIG. 10.

In each block, a numerical value in a square box represents the upper limit value of the number of persons 30 defined for the block, that is the block upper limit value. Also in each block, a numerical value in a circle represents a count of persons 30 actually captured in the block. In the example of FIG. 9, "zero (0) persons" is specified as the block upper limit value to blocks on the first row (including the block a1, the block b1, the block c1, and the block d1), "one (1) person" is specified to blocks on the second row, and "two (2) persons" are specified to the blocks on the third row.

The display controller 14 identifies, for each block, how many captured persons 30 are within the block. Here, a count of captured persons 30 is identified based on the faces of the persons 30. In the example of FIG. 9, for example, the count of persons 30 (more specifically, a count of faces of persons 30) in block a3 is "2", while that in block a2 is "1". In this connection, the face of one person 30 may be located in two or more blocks. For example, the face 80a shown in FIG. 9 is present in both the block b1 and the block b2. For which of the block b1 or b2 the face 80a is counted may be determined based on the location of the face 80a, for example. The area of the face 80a within the block b1, for example, may be compared with the area of the face 80a within the block b2 to find which block includes a greater area of the face 80a, and the face 80a may be counted in that block including the greater area of the face 80a. In the example of FIG. 9, the face 80a is counted as one face in the block b2. In this case, the count of persons 30 in the block b1 is "0" while the count of persons 30 in the block b2 is "2".

After the count of persons 30 is obtained for each of the blocks, the display controller 14 compares, in each block, the block upper limit value (represented by the numerical value in the square box in FIG. 9) and the count of persons 30 (represented by the numerical value in the circle in FIG.

9). When the count of persons 30 exceeds the block upper limit value, the display controller 14 determines one or more persons 30 to be rendered invisible so as to reduce the count of persons 30 to the block upper limit value or lower. For example, in FIG. 9, the block upper limit value for the block c2 is set to "1", while the count of faces is "3". Accordingly, in this example, two persons 30 are selected to be rendered invisible. In selection of the one or more persons 30 rendered invisible from among a plurality of persons 30, the location and the area of the face of each person 30 in the block may be taken into account. For example, the persons 30 to be rendered invisible may be selected in an ascending order beginning with the person in the block having the smallest facial area. In another form, the persons 30 to be rendered invisible may be selected in descending order beginning with the person in the block whose face is located at a position furthest from a predetermined reference position (such as, for example, the center position of the block). In the example of FIG. 9, the persons 30 to be rendered invisible are selected in ascending order beginning with the one having the face of smallest area.

After the selected persons 30 are rendered invisible as described above, the entertainment effect video 24 shown in FIG. 10 is obtained. As can be seen from FIG. 10, by selecting the persons 30 who are rendered invisible so as to maintain the count of faces of the persons 30 captured in each of the block at or below the block upper limit value, the persons 30 are suitably scattered in the entertainment effect video 24. As a result, it becomes possible to obtain the entertainment effect video 24 which appears more natural and real.

Meanwhile, the entertainment effect video 24 includes the persons 30 and the stationary objects 32 such as a building. Hereinafter, elements, such as the persons 30 and the stationary objects 32 constituting a part of the entertainment effect video 24 are referred to as content elements. The number of content elements may be adjusted based on the location of the movable body 10. For example, the theme park 100 is divided into the zones A1 to A3 as described above. The number of content elements may be increased around the center of each of the zones A1 to A3, and decreased near borders between the zones A1, A2, and A3. For example, when the movable body 10 is located at a position P2 shown in FIG. 1, the content elements included in the entertainment effect video 24 may be reduced from those included in the entertainment effect video 24 when the movable body 10 is located at a position P1 shown in FIG. 1. As a way of reducing the content elements, the number of content elements included in the entertainment effect video 24 may be gradually decreased as the movable body 10 approaches a border between zones. Alternatively, the degree of brightness of the entertainment effect video 24 may be gradually decreased as the movable body 10 approaches the border between zones, and the entertainment effect video 24 may be completely blacked out in the vicinity of the border between zones. This can allow the passengers to recognize a transition from one zone having a particular theme to another zone having another theme.

Figure 11:
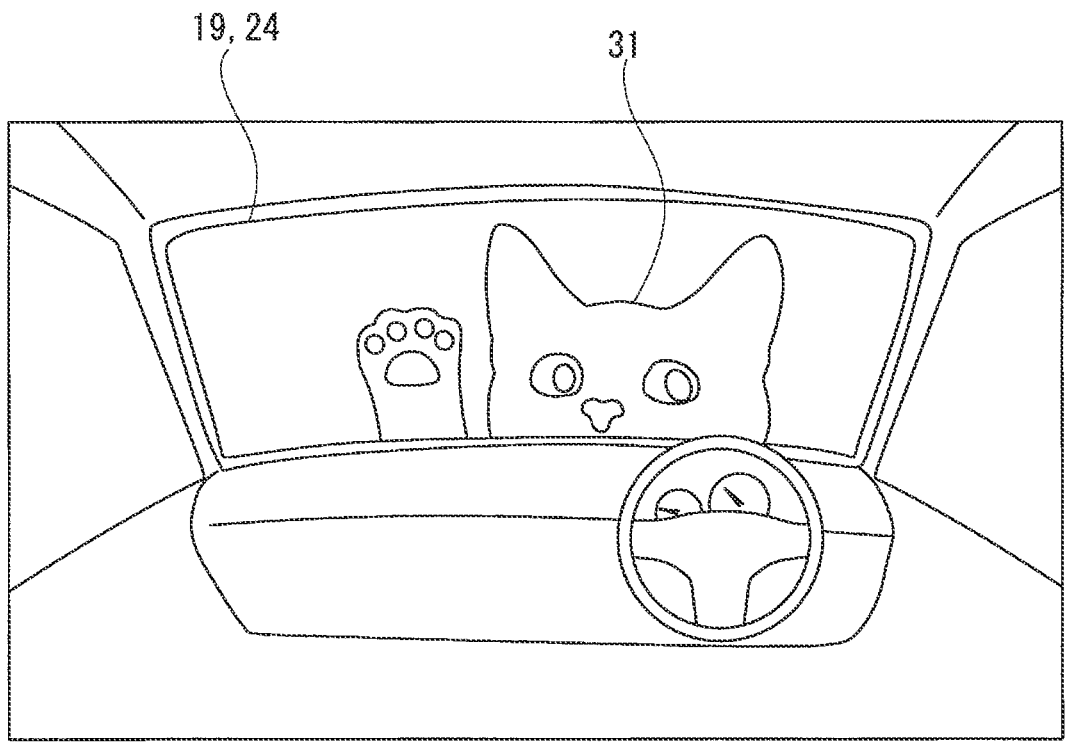
FIG. 11 shows an example of an entertainment effect video to be generated when harsh braking is applied.

In the above explanation, the entertainment effect video 24 is generated irrelevant of a driving condition of the movable body 10, but the content of the entertainment effect video 24 may be changed in a manner linked to the driving condition of the movable body 10. In a specific example, although the movable body 10 is required to move stably, there may be an instance when a driving incident unpleasant to passengers may occur for some reason. For example, harsh braking of the movable body 10 may be required to avert a hazard. Such harsh braking, which unexpectedly exerts a significant inertial force on passengers, can be unpleasant to a passenger. When such an incident occurs, the entertainment effect video 24 may be generated to invoke an artificial impression that the harsh braking is caused by the presence of a character. At an occurrence of harsh braking, for example, an entertainment effect video 24 including a scene which shows a giant cat character 31 stopping the movable body 10 may be displayed on the virtual window 19 defined at a position of a front face of the movable body 10 as shown in FIG. 11. There may be another instance wherein the movable body 10 is temporarily halted to allow a pedestrian to cross a road in front of the movable body 10 or in response to a traffic light. Such stops can lead to a prolonged traveling time and be perceived by passengers as an unpleasant event. In this case, for example, the entertainment effect video 24 may be displayed on the virtual display 19 defined at the position of the front face of the movable body 10 to invoke an artificial impression that the movable body 10 is halted by the giant cat character sleeping on the road in front of the movable body 10.

In this way, in the event of an occurrence of a driving incident unpleasant for the passenger, the driving incident can be turned into an event pleasing to the passenger by displaying the entertainment effect video 24 which causes the passenger to artificially recognize that the driving incident occurred due to the presence of a character. As a result, it becomes possible to ensure that the passenger can further enjoy traveling within the theme park. In particular, because the above-described unpleasant driving incidents are expected to occur infrequently, the entertainment effect video 24 displayed in response to the unpleasant driving incident may be regarded as a rarely experience video. Having an opportunity to watch such a rare video can enhance the feeling of satisfaction of the passenger.

For generation of the thus-displayed entertainment effect video 24, for each driving incident unpleasant for the passenger, a corresponding event video is prestored in the display controller 14. The display controller 14 receives from the vehicle controller 12, as described above, at least a portion of the instruction issued from the vehicle controller 12 to the drive system. Then, the display controller 14 monitors, based on the portion of the instruction received from the vehicle controller 12, whether or not a driving incident unpleasant for the passenger has occurred. When the occurrence of a driving incident unpleasant for the passenger is detected as a result of monitoring, the display controller 14 merges an event video which is associated with the detected driving incident and which shows, for example, the giant cat stopping the movable body 10, into the entertainment effect video 24 in which persons 30 are converted into characters or rendered invisible. Then, the display controller 14 operates the first display device 18 to display the merged entertainment effect video 24.

Figure 12:
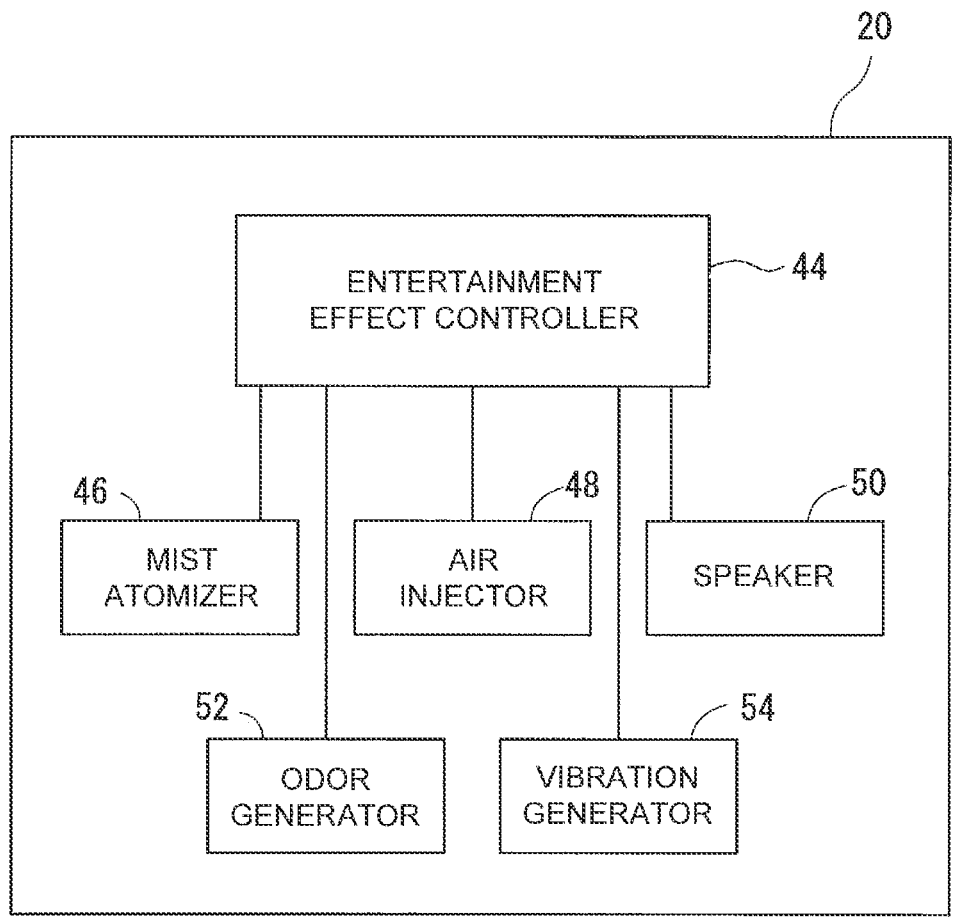
FIG. 12 is a block diagram showing an example of a configuration of an entertainment effect rendering device.

The movable body 10 in this example is equipped with an entertainment effect rendering device 20 configured to apply an entertainment effect triggering at least one of the auditory, olfactory, and tactile to impart a perception of the presence of a character, in a manner linked with or independent of the entertainment effect video 24. FIG. 12 is a block diagram showing an example of a configuration of the entertainment effect rendering device 20. The entertainment effect rendering device 20 includes a mist atomizer 46, an air injector 48, a speaker 50, an odor generator 52, a vibration generator 54, and an entertainment effect controller 44 which controls actuation of these components.

The mist atomizer 46 generates mist, and thus moisture, within the movable body 10 and includes, for example, a pump for pressurizing water and a nozzle for injecting the pressurized water. The air injector 48 injects a jet of air toward an inner space of the movable body 10 to create a wind, and includes a compressor for compressing air, for example. The speaker 50 outputs a voice and other sounds. The odor generator 52 has one or more odor sources and outputs air which is directed to pass through the odor sources toward the inner space of the movable body 10. The vibration generator 54 generates vibrations vibrating the entire movable body 10 or vibrating just a seat on which the passenger is seated, and includes an actuator, such as a motor, a hydraulic cylinder, or a pneumatic cylinder.

The entertainment effect controller 44 is implemented, similarly with the display controller 14, by a computer including a processor and a memory. The entertainment effect controller 44 actuates, in response to an instruction from the display controller 14, the atomizer 46, for example, to apply the entertainment effect which triggers at least one of the auditory sense, olfactory sense, and tactile sense to perceive the presence of a character.

For example, the air injector 48 may be operated to generate a wind blowing along a horizontal direction close to passenger's feet in order to give the passenger an impression of a small animal character running through a region at the passenger's feet. In another example, the vibration generator 54 may be actuated to significantly shake the entire movable body 10 while the speaker 50 is simultaneously operated to produce a sound like a thumping sound caused by a character jumping onto a roof of the movable body 10, in order to give the passenger an impression that the character has jumped onto the roof of the movable body 10. In a further example, an impression that a character having a special odor (such as, for example, a flower fairy emitting a floral scent) is present in close vicinity may be given to the passenger by operating the odor generator 52 to produce the odor associated with the character. In a still another example, the mist atomizer 46 may be operated to generate mist in order to give the passenger an impression that a creature character (such as, for example, a frog character) inhabiting a very humid environment is present in close vicinity of the passenger.

When the entertainment effect rendering device 20 is installed, the entertainment effect which cannot be produced only by a video can be presented, to further enhance reality in the entertainment effect. As a result, the visitor's feeling of being immersed in the atmosphere of the park world can be further enhanced.

Figure 13:
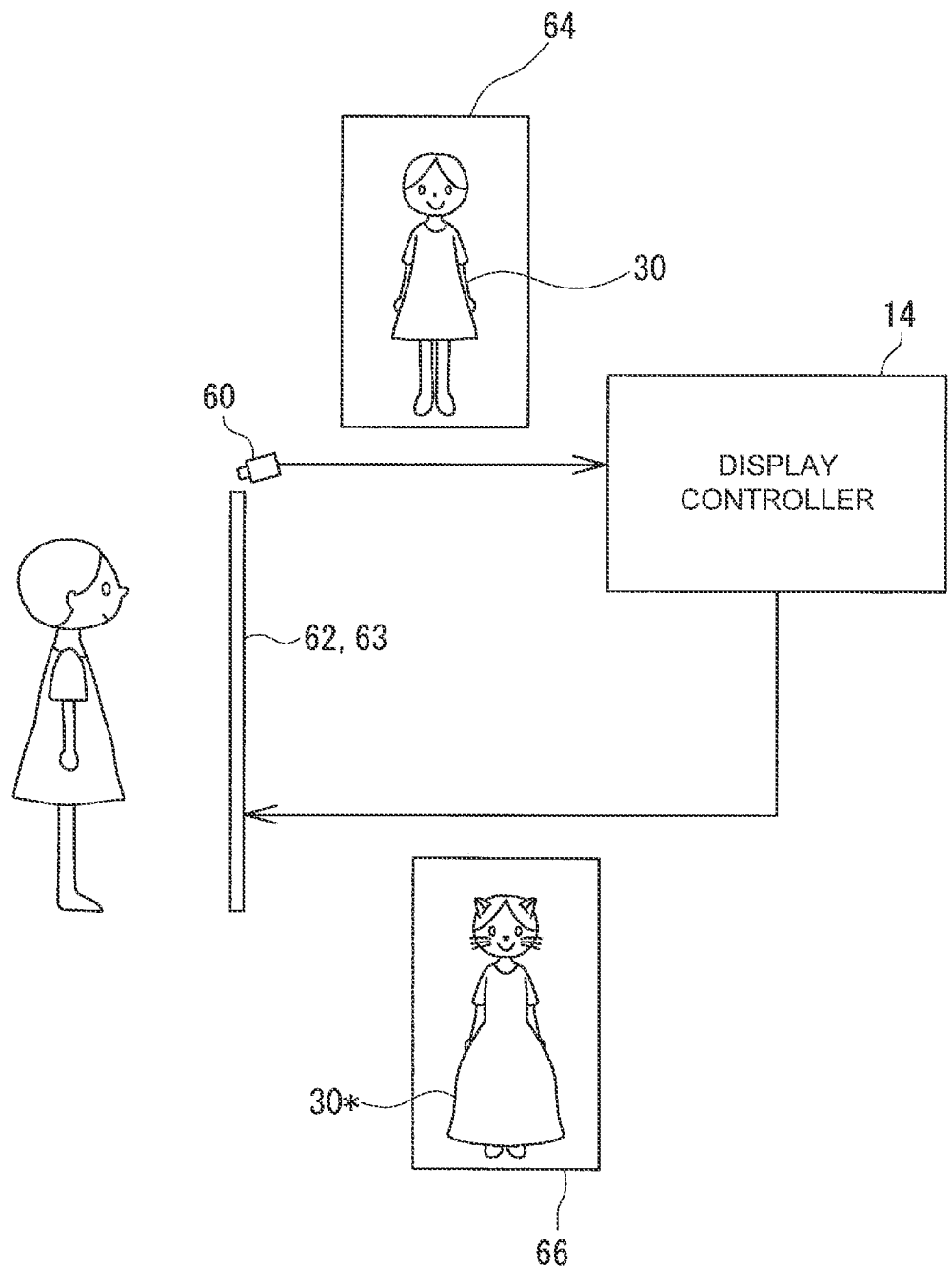
FIG. 13 shows a configuration of a virtual mirror function.

The movable body 10 in this example may further include, as shown in FIG. 13, a second camera 60 and a second display device 62. The second camera 60 and the second display device 62 are installed to offer a virtual mirror function to the passenger.

The second display device 62 is installed inside the movable body 10 and has a display range which functions as a virtual mirror 63. The display range of the second display device 62; i.e., the virtual mirror 63, is provided with decoration which mimics that of a mirror, and thus has an edge surrounded by a wooden frame, for example. The second display device 62 may include, for example, at least one of a liquid crystal display, an organic EL display, and a projector.

The second camera 60 is configured to capture a video of a region opposed to the virtual mirror 63, and acquires a mirror image 64 which should be reflected from the display range of the second display device 62 when the display range is assumed to be a physical mirror. One mirror image 64 may be acquired by mirroring (flipping) the video captured by the single second camera 60. Alternatively, the one mirror image 64 may be acquired by merging two or more videos taken by two or more second cameras 60 into one mirror image 64. In either case, the number of second cameras 60 and arrangement thereof may be determined based on the location, orientation, and size of the virtual mirror 63.

After acquiring the mirror image 64 with the second camera 60, the display controller 14 extracts a figure of a person 30, converts a part or the whole of the figure of the person 30 into that of a character to generate a virtual mirror image 66, and operates the second display device 62 to display the generated virtual mirror image 66. The type of the character into which the person 30 is converted may be automatically determined by the display controller 14 or may be selected by each passenger as they desire.

In either case, when the virtual mirror image 66 is provided to a passenger located in front of the virtual mirror 63, the passenger can have an impression of experiencing their transfiguration into the character and becoming an inhabitant of the park world. This can help improve the passenger's feeling of being immersed in the atmosphere of the park world.

It should be noted that the above-described components, configurations, and features are presented merely by way of illustration, and, other than the feature that the entertainment effect video obtained by partially altering the vehicle window view video is displayed on the display range of the first display device 18 (the virtual window 19) disposed on the inner face of the movable body 10, may be changed as appropriate. For example, while the examples have been explained with reference to a movable body 10 which moves only within the park, the movable body 10 may also move outside a predetermined area for the purpose of transporting a visitor at the predetermined area. The movable body 10 may be, for example, a shuttle bus for transporting the visitor between the park and an external facility located outside the park, such as, for example, a parking lot or hotel. In this case, the level of entertainment effect applied to the vehicle window view video 22 may be increased or decreased based on the distance between the movable body 10 and the park. For example, as the movable body 10 approaches the park, the number of persons 30 to be converted into characters may be gradually increased. In this way, the passenger can intuitively recognize that they are approaching the park, and increase anticipation of entering the park.

REFERENCE SIGN LIST 10 movable body, 12 vehicle controller, 14 display controller, 16 first camera, 18 first display device, 19 virtual window, 20 entertainment effect rendering device, 22 vehicle window view video, 24 entertainment effect video, 30 person, 32 stationary object, 36 entertainment effect data, 38 reference data, 39 replacement image, 44 entertainment effect controller, 46 mist atomizer, 48 air injector, 50 speaker, 52 odor generator, 54 vibration generator, 60 second camera, 62 second display device, 63 virtual mirror, 64 mirror image, 66 virtual mirror image, 100 theme park, 110 travel route.

The invention claimed is:

1. A movable body for transporting a visitor at a predetermined area, comprising:

a first display device configured to display a video on a virtual window being a display area defined on an inner surface of the movable body; and a display controller configured to partially alter a vehicle window view video corresponding to a view that would be seen through the virtual window were the virtual window a physical window on the inner surface of the movable body, to generate an entertainment effect video, and display the generated entertainment effect video on the virtual window, wherein the display controller is further configured to partially or entirely convert a figure of a person displayed in the vehicle window view video into that of a fictitious character, to generate the entertainment effect video.

2. The movable body according to claim 1, wherein the display controller is further configured to convert at least one of a plurality of persons contained in the vehicle window view into an invisible form, to generate the entertainment effect video.

3. The movable body according to claim 2, wherein the display controller is further configured to determine the number of persons who are converted into the invisible form so as to maintain a count of persons or fictitious characters displayed in the entertainment effect video at or below a predetermined number.

4. The movable body according to claim 1, wherein:
the predetermined area is divided into a plurality of zones having themes different from each other, and
the display controller is further configured to change a subject of conversion in a vehicle window view image based on the theme of the zone in which the movable body is located.

5. The movable body according to claim 4, wherein the display controller is further configured to reduce the number of content elements which are included in the entertainment effect video when the movable body is located close to a border between the zones to below the number of content elements included in the entertainment effect video when the movable body is located at a center of the zone.

6. The movable body according to claim 1, further comprising:
an entertainment effect rendering device configured to generate at least one of vibration, a sound, an odor, moisture, and a wind that triggers a sense of perceiving a presence of a fictitious character in a manner linked with the entertainment effect video.

7. The movable body according to claim 1, wherein the display controller is further configured to generate, when a driving incident unpleasant for passengers occurs, an entertainment effect video that invokes a false recognition that the driving incident is caused by the presence of a character.

8. The movable body according to claim 1, further comprising:
a second display device configured to display a video on a virtual mirror being a display range defined in an inner region of the movable body, and
the display controller is further configured to partially or entirely convert a figure of a person contained in a mirror image as would be originally obtained from the virtual mirror were the virtual mirror assumed to be a physical mirror, into that of a fictitious character to generate a virtual mirror image video, and display the generated virtual mirror video on the virtual mirror.

9. A movable body for transporting a visitor at a predetermined area, comprising:
a first display device configured to display a video on a virtual window being a display area defined on an inner surface of the movable body; and
a display controller configured to partially alter a vehicle window view video corresponding to a view that would be seen through the virtual window were the virtual window a physical window on the inner surface of the movable body, to generate an entertainment effect video, and display the generated entertainment effect video on the virtual window,
wherein the display controller is further configured to convert at least one of a plurality of persons contained in the vehicle window view into an invisible form, to generate the entertainment effect video.

10. A movable body for transporting a visitor at a predetermined area, comprising:
a first display device configured to display a video on a virtual window being a display area defined on an inner surface of the movable body;
a display controller configured to partially alter a vehicle window view video corresponding to a view that would be seen through the virtual window were the virtual window a physical window on the inner surface of the movable body, to generate an entertainment effect video, and display the generated entertainment effect video on the virtual window,
wherein the display controller is further configured to generate, when a driving incident unpleasant for passengers occurs, an entertainment effect video that invokes a false recognition that the driving incident is caused by the presence of a character.

\* \* \* \* \*